United States Patent
Joy et al.

(10) Patent No.: US 7,185,088 B1
(45) Date of Patent: Feb. 27, 2007

(54) SYSTEMS AND METHODS FOR REMOVING DUPLICATE SEARCH ENGINE RESULTS

(75) Inventors: Navin Martin Joy, Redmond, WA (US); Sally Salas, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 872 days.

(21) Appl. No.: 10/403,621

(22) Filed: Mar. 31, 2003

(51) Int. Cl.
*G06F 15/13* (2006.01)

(52) U.S. Cl. .............................. 709/224; 707/5; 707/6; 707/200

(58) Field of Classification Search ................ 709/224; 707/5, 6, 200
See application file for complete search history.

(56) References Cited

U.S. PATENT DOCUMENTS

| | | | | |
|---|---|---|---|---|
| 6,081,805 | A | 6/2000 | Guha | 707/5 |
| 6,178,419 | B1* | 1/2001 | Legh-Smith et al. | 707/6 |
| 6,366,910 | B1 | 4/2002 | Rajaraman et al. | 707/5 |
| 6,401,118 | B1* | 6/2002 | Thomas | 709/224 |
| 6,434,556 | B1* | 8/2002 | Levin et al. | 707/5 |
| 6,546,393 | B1* | 4/2003 | Khan | 707/10 |
| 2003/0046311 | A1* | 3/2003 | Baidya et al. | 707/200 |

OTHER PUBLICATIONS

Liu, J., "Guide to Meta-Search Engines," Indiana University Libraries, Jun. 1999, 5 pages (//www.indiana.edu/~librcsd/search/meta.html).
UC Berkeley Library, "Meta-Search Engines: Teaching Library Internet Workshops," Jun. 20, 2003, 4 pages (//www.lib.berkeley.edu/TeachingLib/Guides/Internet/MetaSearch.html).

* cited by examiner

*Primary Examiner*—Viet D. Vu
*Assistant Examiner*—Jinsong Hu
(74) *Attorney, Agent, or Firm*—Woodcock Washburn LLP

(57) ABSTRACT

The present invention is directed toward efficiently locating desired information and, more specifically, to providing a system and method for removing unnecessary multiple references to a common resource such as redundant listed Uniform Resource Locators (URLs) that reference the same display URLs (and thus the same Web page) as another listed URL. Consequently, in circumstances where only a smaller, finite number of listed results are immediately used (such as displaying only the twenty most relevant results on the first page presented to a search engine end-user), the finite number of listed results may corresponds to a greater number of unique display URLs than would otherwise occur absent this form of filtering.

40 Claims, 5 Drawing Sheets

SYSTEMS AND METHODS FOR REMOVING DUPLICATE SEARCH ENGINE RESULTS

TECHNICAL FIELD

The present invention relates generally to the fields of computerized publishing and knowledge management, and more particularly to Internet search engines. The invention, however, is not limited to use in a search engine. On the contrary, the invention could be used in a directory service or other such system using indexing or one-way replication of a document store.

BACKGROUND OF THE INVENTION

A client computer connected to the Internet can download digital information from server computers. Client application software typically accepts commands from a user and obtains data and services by sending requests to server applications running on the server computers. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the Gopher document protocol.

The HTTP protocol is used to access data on the World Wide Web, often referred to as "the Web." The Web is an information service on the Internet providing documents and links between documents. It is made up of numerous Web sites located around the world that maintain and distribute electronic documents. A Web site may use one or more Web server computers that store and distribute documents in a number of formats, including the Hyper Text Markup Language (HTML). An HTML document contains text and metadata (commands providing formatting information), as well as embedded links that reference other data or documents. The referenced documents may represent text, graphics, or video.

A Web browser is a client application or, preferably, an integrated operating system utility that communicates with server computers via FTP, HTTP and Gopher protocols. Web browsers receive electronic documents from the network and present them to a user.

An intranet is a local area network containing Web servers and client computers operating in a manner similar to the World Wide Web described above. Typically, all of the computers on an intranet are contained within a company or organization.

The term "search engine" is often used generically to describe both true search engines and directories, although they are not the same. Search engines typically create their listings automatically by directly or indirectly "crawling" the Web. A directory, on the other hand, depends on humans for its listings, i.e., a person submits a short description for an entire site or editors write a description for sites they review. The present invention is particularly suited (although not necessarily limited) for use in a search engine directly or indirectly gathers information by "crawling" the Web.

Most search engines can be categorized as "simple" search engines, "compilation" search engines, or "complex" search engines. A simple search engine is a coordinated set of programs that generally include (a) a crawler (also called a "spider" or a "bot") that goes to every page or representative pages on every accessible Web site, analyzes the data therein (content, metadata, and so forth), and traverses each link thereon; (b) an indexer which creates and maintains a huge index (sometimes called a "catalog") from the pages that have been crawled; and (c) an interface which interactively receives an end-user search request based on inputted search terms and, using the entries in the index, returns URLs of Web pages to the user related to the inputted search terms. Some simple search engines may also have added functionality that allow an end-user to input a natural language query, corrects for misspelled words in search terms, expands searches based on logical synonyms for search terms, or other such features. A compilation search engine looks very similar to a simple search engine from the perspective of an end-user, but a compilation search engine is often little more than an enhanced user interface that submits a single query entered by an end-user to multiple simple search engines and then compiles the results and presents to the end-user as a single list. A complex search engine is both a compilation search engine (compiling search results from other simple search engines) and a simple search engine (conducting its own web crawls). Like a compilation search engine, a complex search engine also looks very much like a simple search engine from the perspective of an end-user.

Whether directly or indirectly, all three types of search engines utilize Web page information gathered by crawlers that visit the universe of accessible Web pages, including returning to previously visited Web sites on a regular basis to look for changes. Everything the crawler finds goes into the index which essentially holds a copy of every Web page that the crawler finds, and if a Web page changes the index is then updated with new information. When an end-user inputs a search query, the interface sifts through the pages recorded in the index to find documents fulfilling a search query and will typically rank the matches in accordance with their relevance.

Of course, the fact that the same Web page can be accessed by many different Uniform Resource Locators (URLs) often results in numerous copies of the same page being indexed by the crawlers. Consequently it is not uncommon for a search engine query to yield results comprising multiple "listed" URLs that ultimately lead to the same Web page resource (the "display" URL), with each listed URL having a different relevance. For a search engine user, multiple listed URLs to the same resource are not particularly useful, and the industry to date has not adequately addressed this shortcoming in the art.

SUMMARY OF INVENTION

The present invention is directed toward efficiently locating desired information. The present invention provides a system and method for removing unnecessary multiple references to a common resource such as, in one embodiment of the present invention, removing certain redundant listed Uniform Resource Locators (URLs) that reference the same display URLs (and thus the same Web page) as another listed URL.

In one embodiment of the present invention, the URL duplicate removal system comprises a "display" subsystem that, when provided a plurality of listed URLs (including but not limited to a list generated by a search engine query or by a compilation of results from multiple search engines), determines the display URL for each listed URL (wherein the display URL may or may not be the same as the listed URL). This information is then used by a "comparison" subsystem to determine if any subset of listed URLs have the same display URL—that is, the comparison subsystem logically operates to separate the listed URLs into groups based on common display URLs. These groups, in turn, are processed by a "removal" subsystem to eliminate some or all of the "duplicate" listed URLs depending on selection rules that determine which listed URLs cannot be eliminated and which ones are expendable (can be eliminated) in favor of retaining (not eliminating) another listed URL having the same display URL. For example, in a group having more than one listed URL for a specific display URL, the removal subsystem may operate to remove all but the most relevant listed URL (that is, the listed URL having the highest relevance score). By operating recursively on all such groups derived for a plurality of listed URLs, the net results are a filtered list of listed URLs corresponding to fewer display URLs. Consequently, in circumstances where only a smaller, finite number of listed results are immediately used (such as displaying only the twenty most relevant results on the first page presented to a search engine end-user), the finite number of listed results may corresponds to a greater number of unique display URLs than would otherwise occur absent this form of filtering.

While some embodiments of the present invention may operate to eliminate all but one listed URL for each unique display URL determined by the display subsystem for any given plurality of listed URLs, other embodiments may employ a different selection rule that allows exceptions when having more than one listed URL per display URL is advantageous. For example, in the context of a search engine, if two listed URLs having the same display URL generate revenue for the search engine host each time they are listed in search engine results, it may be economically advantageous for the search engine host to list both URLs (thus being paid for each) despite the duplication. Thus in some embodiments these kinds of paying URLs may be immune from elimination, in which case all non-paying URLs having the same display URL will be eliminated regardless of relevance. As a result, the selection rules used by various embodiments of the present invention may weigh different factors such as relevance and income potential to not only determine which URLs to eliminate but to also determine if and when more than one listed URL corresponding to the same display URL will be retained despite the duplication. Furthermore, these same factors may also be used to determine the order in which the remaining listed URLs are presented to an end-user—for example, presenting the paying URLs first in order of relevance (highest to lowest) and then presenting the non-paying URLs thereafter and again in order of relevance.

Particularly relevant to the foregoing example, another embodiment of the present invention might also employ a selection rule such that certain listed URLs that are not being eliminated, such as paying URLS, are able to swap relevance (including associated content, if any) with other display URLs with a higher relevance having the same display URL but which have been selected for elimination. This swapping functionality, in regard to the present example, gives the paying URLs the highest relevance possible and enhances the order of their listing when relevance is taken into account.

In any event, the selection rules employed by certain embodiments may comprise certain sub-rules, each of which operates to further the filtering process as defined for each particular embodiment and which may work together with other sub-rules or conditionally dependent upon conditions present in the plurality of listed URLs.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Computer Environment

Figure 1:
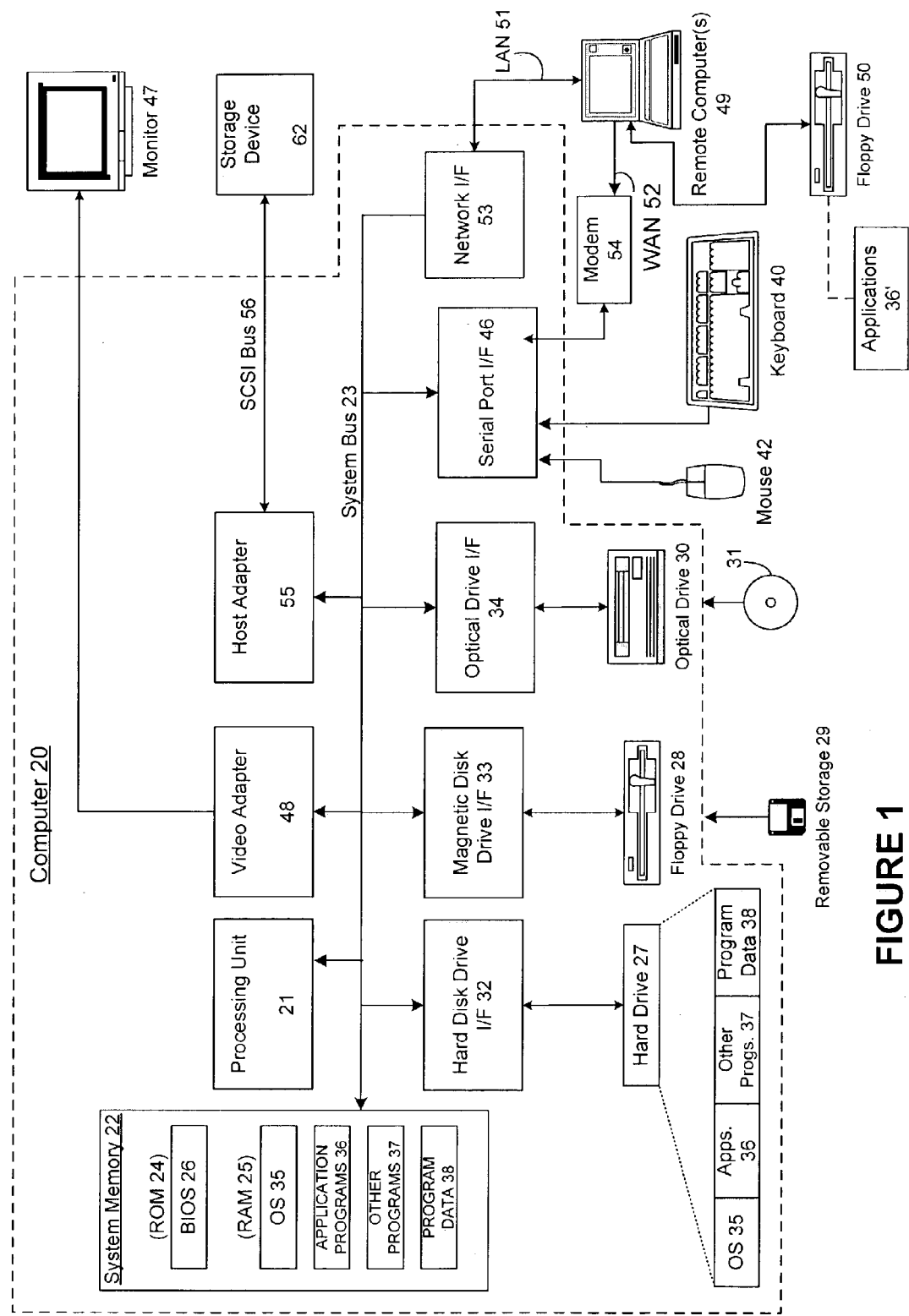
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2:
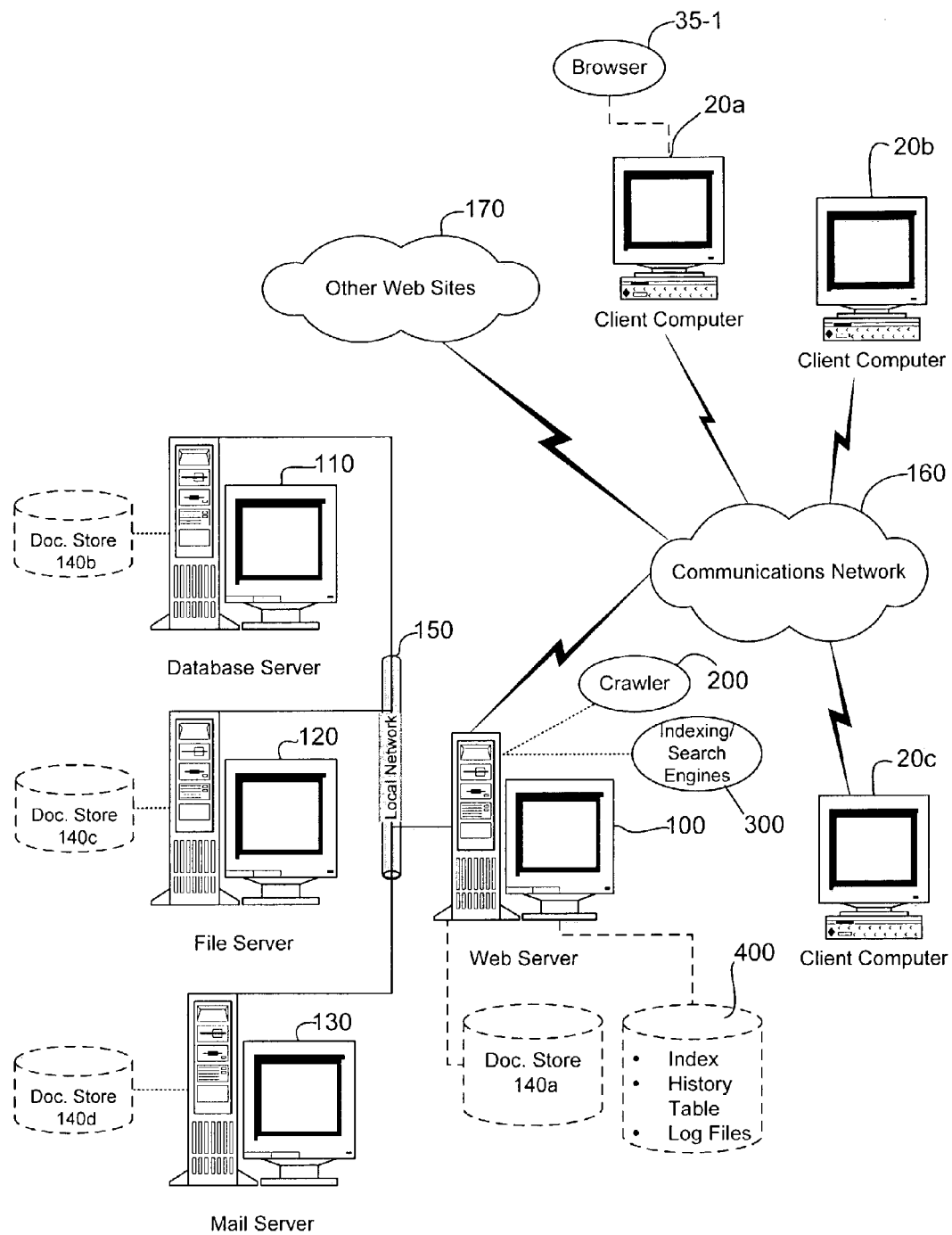
FIG. 2 is schematic diagram representing a network in which aspects of the present invention may be incorporated.

As noted, the computer described above can be deployed as part of a computer network. In general, the above description applies to both server computers and client computers deployed in a network environment. FIG. 2 illustrates one such exemplary network environment in which the present invention may be employed.

As shown, a Web server 100 is interconnected with a number of other server computers, such as a database server 110, a file server 120, and a mail server 130. The Web server 100 includes a document store 140*a*. Similarly, the database server, file server, and mail server include document stores 140*b*, 140*c* and 140*d*, respectively. In this example, the Web server, database server, file server, and mail server are part of a local area network 150. A wide area communications network 160 (e.g., the Internet) permits remote Web sites 170 and client computers 20*a*, 20*b*, 20*c*, etc. (each equipped with a browser 35-1), to gain access to Web server 100, e.g., to search for documents or other forms of electronically stored information.

The Web server 100 contains a Web crawler program 200, which is employed as described above to gather information for use in a searchable index. In addition, as shown, the Web server contains a search engine 300 and a persistent store 400 for the index, History Table and log files. The Web crawler program 200 searches for electronic documents distributed on one or more computers connected to the Web server 100, including servers 110, 120 and 130, as well as remotely connected Web site(s) 170. Although the network 150 is shown as a local area network, it may be a WAN or a combination of networks that allow the Web server 100 to communicate with other computers having associated document stores available for indexing.

The Web crawler program 200 searches its own document store 140*a* and those of remote servers for electronic documents. It retrieves documents and associated data. The contents of the electronic documents, along with associated data, can be used in a variety of ways. For example, the Web crawler 200 may pass the information to indexing/search engines 300. The indexing engine 300 is a computer program that maintains an index 400 of electronic documents. The index is like the index in a book and contains reference information and pointers to electronic documents to which the reference information applies. For example, the index may include keywords and for each keyword a list of addresses. Each address can be used to locate a document that includes the keyword. The index may also include information other than keywords used within the electronic documents. For example, the index may include subject headings or category names, even when the literal subject heading or category name is not included within the electronic document. The type of information stored in the index depends upon the complexity of the indexing engine 300, which may analyze the contents of the electronic document and store the results of the analysis.

A client computer, such as computer 20a, includes an OS browser function 35-1 (or separate browser application) that locates and displays documents to a user. When a user at the client computer desires to search for one or more electronic documents, the client computer transmits data to the search engine 300 requesting a search. At that time, the search engine examines its associated index 400 to find documents that may be desired by the user. The search engine may then return a list of documents to the browser 35-1. The user may then examine the list of documents and retrieve one or more desired electronic documents from remote computers.

As will be readily understood, the system illustrated in FIG. 2 is exemplary, and alternative configurations may also be used in accordance with the invention. For example, the Web crawler program 200 and indexing engine and search engines 300 may reside on different computers. Additionally, the Web browser 35-1 and the Web crawler program 200 may reside on a single computer. Further, the indexing and search engines 300 are not required by the present invention. The Web crawler program 200 may retrieve electronic document information for uses other than providing the information to a search engine. As discussed above, the client computer(s) 20a–20c, server computers 100–130, and remote Web site(s) 170 may communicate through any type of communications network or medium.

Search Engine

Figure 3:
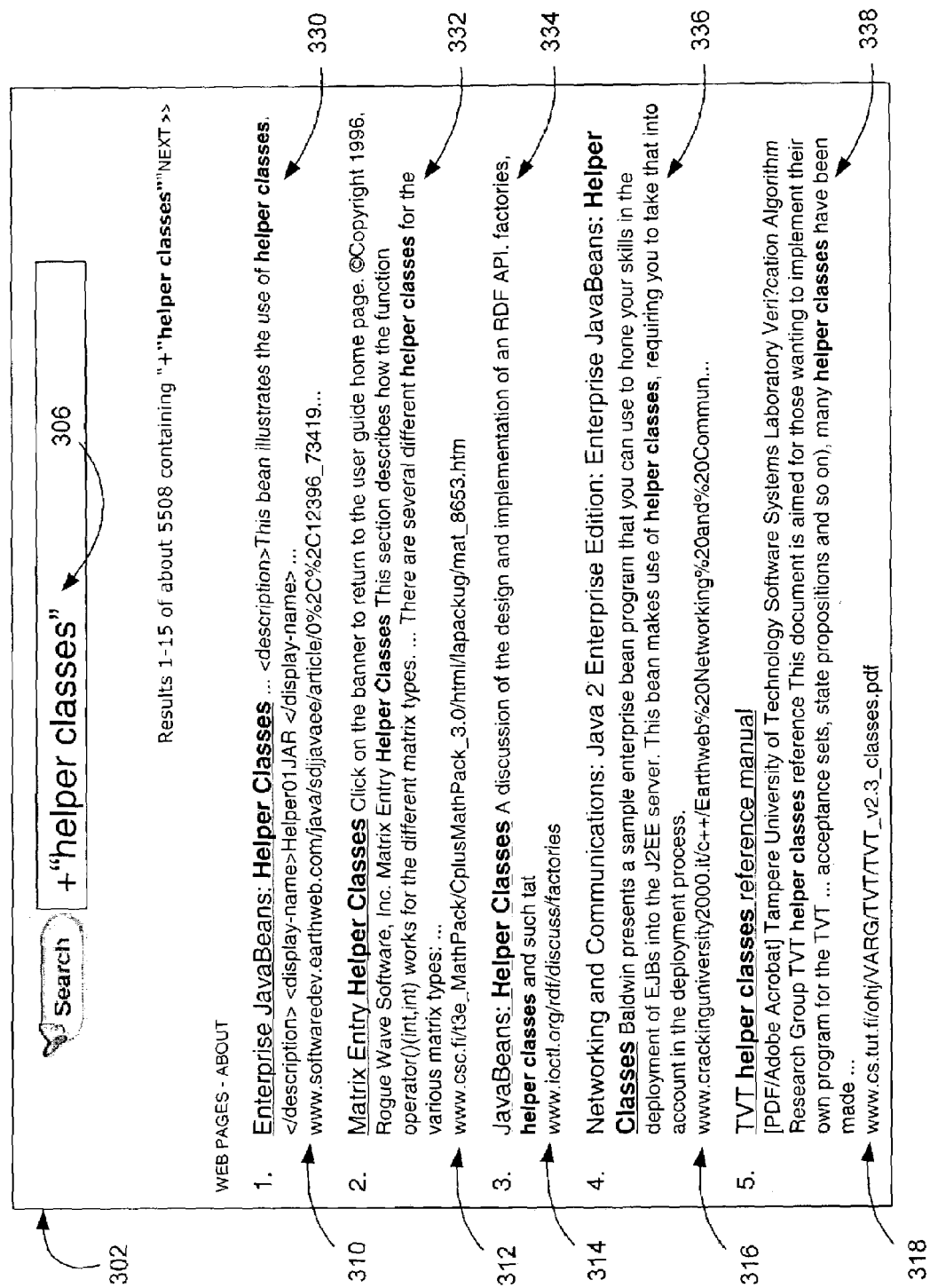
FIG. 3 is an illustration of how search engine results can be displayed to an end-user.

FIG. 3 is an illustration of how search engine results might be displayed to an end-user who would benefit from the utilization of various embodiments of the present invention. The search engine window 302 lists the listed URLs 310, 312, 314, 316, and 318 for various Web sites that meet the search criteria 306 entered by the end-user. Each listed URL 310, 312, 314, 316, and 318 has an associated relevance (not shown) by which the listed URLs 310, 312, 314, 316, and 318 have been sorted such that the listed URLs 310, 312, 314, 316, and 318 are presented in order of relevance from highest to lowest among the results provided. In this example, the listed URLs 310, 312, 314, 316, and 318 also have relevance content 330, 332, 334, 336, and 338 corresponding to each listed URLs' associated relevance (not shown). However, unbeknownst to the end-user, some of these listed URLs (e.g., 310, 314, and 316) may lead the end-user to the same destination Web page if selected because they all call the same display URL (not shown), and thus these listed URLs are duplicate URLs.

Duplicate URL Removal

Figure 4A:
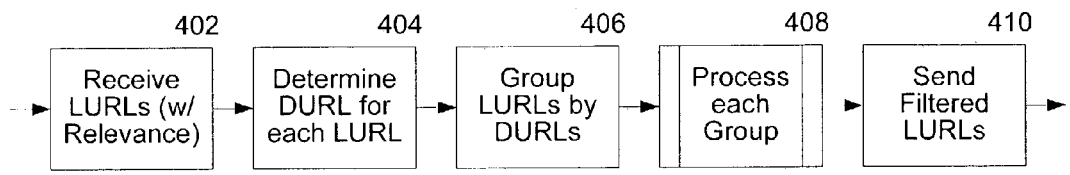
FIG. 4A is a flowchart of a method for performing duplicate URL removal in accordance with one embodiment of the present invention.

To solve the dilemma of duplicate URLs, one embodiment of the present invention specifically directed to search engines is described herein, and FIG. 4A is a flowchart of the method corresponding to this particular embodiment. Here the duplicate URL removal system, at step 402, receives a plurality of listed URLs and corresponding relevance (including relevance content, if any) ("LURLs") and, at step 404, determines the display URL ("DURL") for each listed URL. At step 406, the system then groups the listed URLs according to display URLs such that all listed URLs having a common display URL are grouped together. At step 408, each such group is processed to eliminate certain duplicate URLs (listed URLs having a common display URL) in accordance with certain selection rules used by the system to ascertain which duplicate URLs are eliminated and which are retained. Upon completion of the selection process, at step 410, the remaining listed URLs (or "filtered URLs") are then returned to the system from which the listed URLs were initially received in step 402 or to another object specified by such system.

Figure 4B:
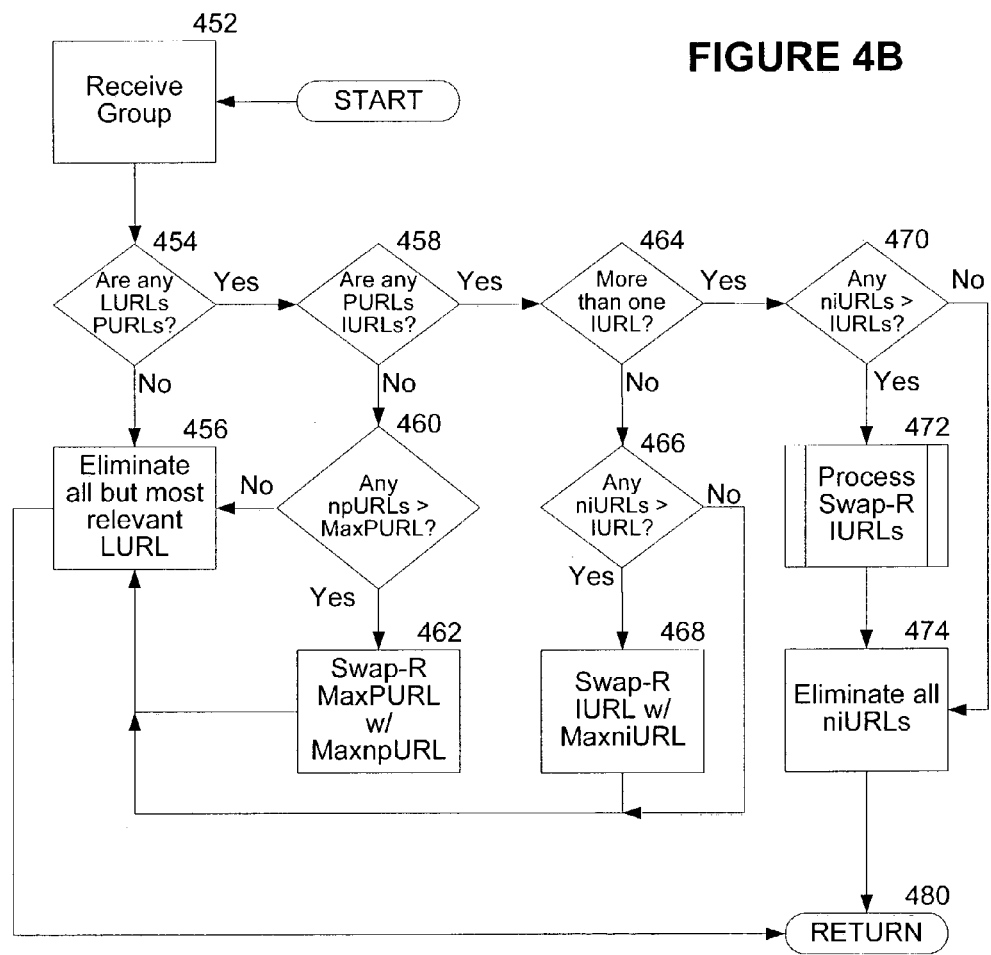
FIG. 4B is a flowchart of the process task referenced in FIG. 4A.

FIG. 4B is a flowchart of the process task referenced in FIG. 4A as separately applied to each group corresponding to the listed URLs (LURLs) having a common display URL (DURLs). In this figure, at step 450, the process starts with, at step 452, the receipt of the group and the initial determination, at step 454, of whether any listed URLs (that are part of the group) are paying URLs ("PURLs") (e.g., URLs that in some way provide compensation to another entity such as the search engine provider—for each end-user who visits a Web site by means of the specific URL, a business model that is well-known and appreciated by those of skill in the relevant art). If none of the listed URLs are paying URLs then, at step 456, for the present embodiment of the invention and by the application of its inherent selection rules reflected in this flowchart, the system proceeds to eliminate all but the most relevant listed URL and then, at step 480, the system returns the results to the parent process of the system described in FIG. 4A.

On the other hand, if any of the listed URLs is a paying URL, at step 458 the system determines if any of the paying URLs are immune URLs ("IURLs")—that is, if any of the paying URLs are immune from elimination. (The present embodiment presumes that some paying URLs may be immune from elimination and that only paying URLs may be immune; of course, other presumptions are possible and the present invention is in no way limited to this particular presumption as described herein). If there are no immune URLs (again, paying URLs that are immune from elimination) then, at step 460, the system determines if any of the non-paying URLs ("npURLs")—that is, any listed URL that is not a paying URL—has a higher relevance than the one paying URL having the highest relevance among paying URLs. If the most relevant paying URL is also the most relevant listed URL in the group, then at step 456 the system eliminates all but the most relevant listed URL (which, by default, is a paying URL). However, if there is at least one non-paying URL with a higher relevance than the most relevant paying URL ("MaxPURL"), then at step 462 the most relevant paying URL and the most relevant non-paying URL ("MaxnpURL") swap their respective relevances (including any relevance content) and then, at step 456, all of the listed URLs are eliminated except for the most relevant listed URL (which, because of the swap, is the most relevant paying URL).

Returning to step 458, if any of the paying URLs are in fact immune from elimination, at step 464 the system determines if there are more than one immune URLs and, if not, the system the proceeds to step 466 to determine if any non-immune URLs ("niURLs")—that is, any of the listed URLs that are not immune—have a higher relevance than the one immune URL. If the immune URL is also the most relevant listed URL in the group, then the system immediately steps to 456 and eliminates all but the most relevant listed URL (which, in this case, is also the immune URL). However, if there is at least one non-paying URL with a higher relevance than the immune URL, then at step 468 the immune URL and the most relevant non-immune URL ("MaxniLURL") swap their respective relevances (including any relevance content) and then again, at step 456, all of the listed URLs are eliminated except for the most relevant listed URL (which, because of the swap, is the immune URL).

Lastly, if there are in fact more than one immune URL, than the system, at step 470, determines any of the non-immune URLs have a higher relevance than any of the immune URLs. If not, then at step 474 the system simply eliminates all non-immune URLs (thereby retaining all immune URLs) and the process ends with a return of the results to the calling parent process of FIG. 4A. However, this step 474 only applies when the relevance among the immune URLs is not important; if the relevance among the immune URLs is important (perhaps because one such immune URL pays better than another based on the immune URLs "value"), then step 474 would not exist and all and the process would step from 464 to 472 automatically. In any event, Step 472 processes the listed URLs to swap higher relevances for non-immune URLs with lesser relevant immune URLs, and then proceeds, via step 480, to return the immune URLs to the calling process of FIG. 4A.

Figure 4C:
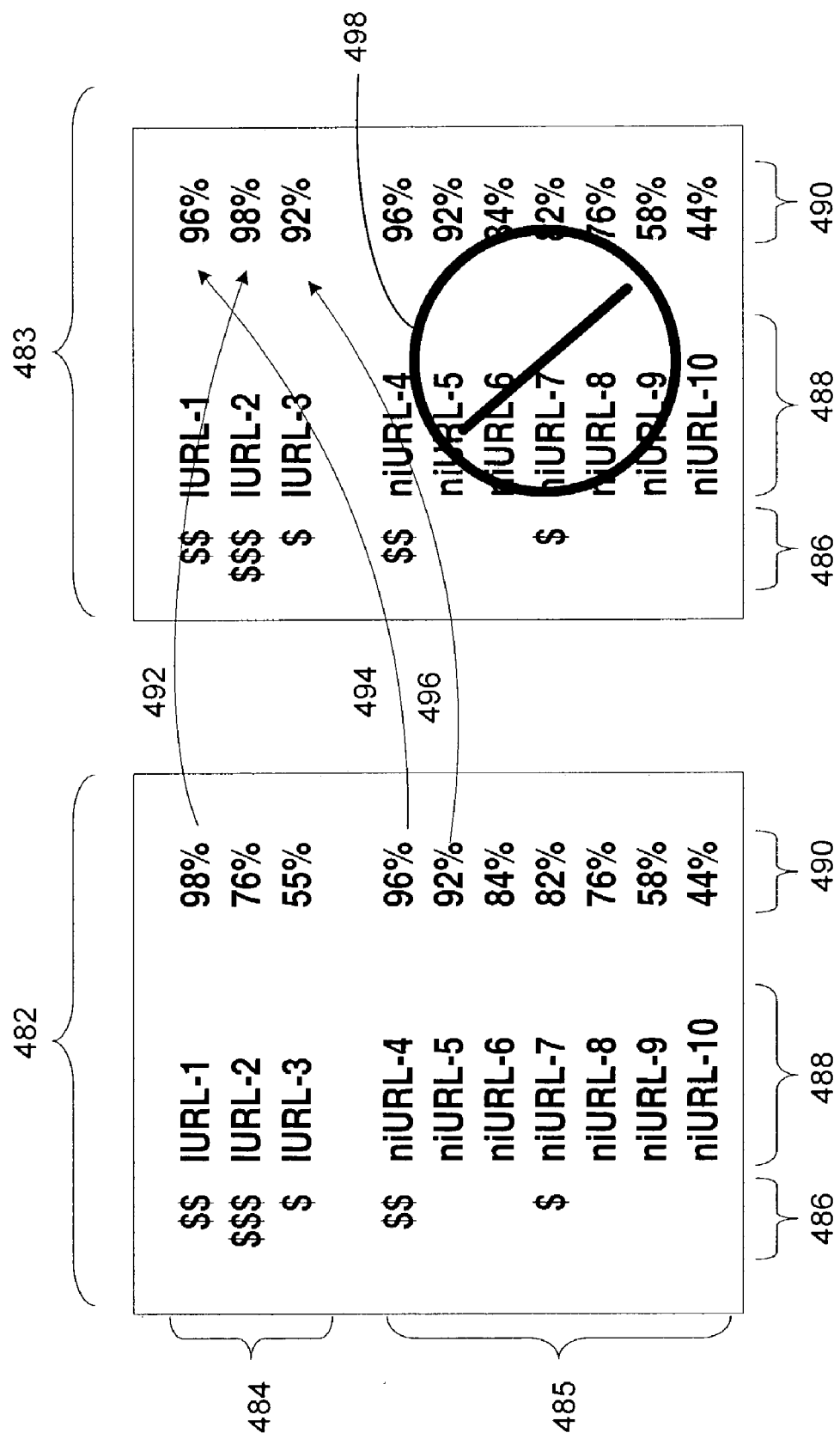
FIG. 4C is a illustration of the operation of the process task referenced in FIG. 4B.

FIG. 4C is a illustration of the operation of the process task referenced in FIG. 4B. More specifically, FIG. 4C illustrates the swap process for multiple immune URLs for in embodiment of FIG. 4B for one embodiment of the present invention wherein the relevance order of the immune URLs is important based on the amount paid by each immune URL (the higher amounts denoted by a greater number of dollar signs). Here is shown the unswapped listed URLs 482 and swapped listed URLs 483 which, for illustrative purposes, are conveniently grouped into immune URLs 484 and non-immune URLs 485. Each URL (all of which, again, share a common display URL) comprise not just an actual URL 488 but also their corresponding relevances 490 and values 486. In this embodiment, the most valuable immune URL or highest paying immune URL (which is "IURL-2") is assigned, as reflected in swapped listed URLs 483, the highest relevance in the group 492; likewise, the second-highest paying immune URL ("IURL-1") is assigned the second-highest relevance 492 and the third-highest paying immune URL ("IURL-3") is assigned the third-highest relevance 494. In this embodiment, the two non-immune URLs ("niURL-4" and "niURL-5") do not necessarily have their relevances changed because, in this embodiment, these URLs, along with the other non-immune URLs, are eliminated 496.

In all of the foregoing embodiments, the duplicate URL removal system can be operated real-time (i.e., functioning in the period of time between the query being submitted by the end-user to a search engine and the results being displayed by the search engine to the end-user) or off-line (such as in the context of a directory). Moreover, the selection rules used can be varied and diverse, a fact readily appreciated by those of skill in the art. Finally, the manner in which the search engine displays the filtered results of the duplicate URL removal system can also be varied such that results may be shown in order of relevance or perhaps in order value (for paying URLs) which, again, are variations that are appreciated by those of skill and the art, all of which are anticipated by the application of this invention.

CONCLUSION

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems, are herein contemplated, especially as the number of wireless networked devices continues to proliferate. Therefore, the present invention should not be limited to any single embodiment, but rather construed in breadth and scope in accordance with the appended claims.

What is claimed is:

1. A method for removing duplicate URLs from a plurality of listed URLs, said method comprising:
  determining a display URL for each of a plurality of listed URLs; and
  determining if any subset comprising at least two listed URLs from among the plurality of listed URLs have the same display URL and, if so, eliminating at least one listed URL from among the subset of listed URLs having the same display URL, wherein specific listed URLs from among the subset of listed URLs having the same display URL are selected for elimination based on a selection rule, wherein the selection rule for the elimination of specific listed URLs from among the subset of listed URLs having the same display URL is for lesser paying listed URLs to be eliminated.

2. The method of claim 1 wherein the plurality of listed URLs are the results of a search engine query.

3. The method of claim 1 wherein the plurality of listed URLs are derived from a compilation of search engine query results.

4. The method of claim 1 wherein the method operates recursively to eliminate all but one listed URL for each unique display URL determined by the method for the plurality of listed URLs.

5. The method of claim 1 wherein the method operates recursively to eliminate all but one listed URL for each unique display URL determined by the method for the plurality of listed URLs, except that any listed URL which is immune from elimination is not eliminated.

6. The method of claim 1 wherein the selection rule for the elimination of specific listed URLs from among the subset of listed URLs having the same display URL is for a lesser relevant listed URL to be eliminated.

7. The method of claim 1 wherein, if any lesser paying listed URL has a higher relevance than the listed URL that is not being eliminated, then the content from the lesser paying listed URL with the highest relevance is swapped with the content for the listed URL that is not being eliminated.

8. The method of claim 1 wherein the selection rule comprises a sub-rule that, if none of the listed URLs among the subset of listed URLs having the same display URL are paying URLs, the lesser relevant URLs from among the subset of listed URLs are eliminated.

9. The method of claim 1 wherein the selection rule comprises a sub-rule that, if at least one listed URL from among the subset of listed URLs having the same display URL is a paying URL and the other listed URLs are not paying URLs, the listed URLs that are not paying URLs are eliminated.

10. The method of claim 9 wherein, if any listed URL that is not a paying URL has a higher relevance than any listed URL that is a paying URL, then the content from a listed URL that is not a paying URL having the highest relevance is swapped with the content for a listed URL that is a paying URL having a lower relevance.

11. The method of claim 9 wherein the method operates recursively, swapping content between listed URLs, until all listed URLs that are paying URLs have a higher relevance than all listed URLs that are not paying URLs.

12. The method of claim 9 further comprising the element of, from among the paying URLs, if none of the paying URLs are immune from elimination, then the lesser relevant paying URLs are eliminated.

13. The method of claim 12 wherein, if any paying URL that is not immune from elimination has a higher relevance than any paying URL that is immune from elimination, then the content from a paying URL that is not immune from elimination having the highest relevance is swapped with the content for a paying URL immune from elimination having a lower relevance.

14. The method of claim 9 further comprising the element of, from among the paying URLs, if at least one paying URL is immune from elimination, then all paying URLs that are not immune from elimination are eliminated.

15. The method of claim 14 wherein, if any lesser paying listed URL have a higher relevance than the listed URL that is not being eliminated, then the content from the lesser paying listed URL with the highest relevance is swapped with the content for the listed URL that is not being eliminated.

16. The method of claim 1 wherein the selection rule comprises a sub-rule that, if the subset of listed URLs is comprised of at least two listed URLs having the same display URL, at least one of which is immune from elimination, then the listed URLs that are not immune from elimination are eliminated.

17. The method of claim 1 wherein the selection rule comprises a sub-rule that, if the subset of listed URLs is comprised of at least two listed URLs having the same display URL, at least one of which is immune from elimination, then the listed URLs that are immune from elimination are not eliminated.

18. A duplicate URL removal system comprising:
means for determining a display URL for each of a plurality of listed URLs;
means determining if any subset comprising at least two listed URLs from among the plurality of listed URLs have the same display URL; and
means for eliminating at least one listed URL from among the subset of listed URLs having the same display URL, wherein specific listed URLs from among the subset of listed URLs having the same display URL are selected for elimination based on a selection rule, wherein the selection rule for the elimination of specific listed URLs from among the subset of listed URLs having the same display URL is for lesser paying listed URLs to be eliminated.

19. The system of claim 18 further comprising means for eliminating all but one listed URL for each unique display URL.

20. The system of claim 18 further comprising means for eliminating all but one listed URL for each unique display URL except for listed URLs which are immune from elimination.

21. The method of claim 18 wherein the selection rule for the elimination of specific listed URLs from among the subset of listed URLs having the same display URL is for a lesser relevant listed URL to be eliminated.

22. The method of claim 18 wherein, if any lesser paying listed URL has a higher relevance than the listed URL that is not being eliminated, then the content from the lesser paying listed URL with the highest relevance is swapped with the content for the listed URL that is not being eliminated.

23. A computer-readable medium bearing computer-readable instructions for:
determining a display URL for each of a plurality of listed URLs; and
determining if any subset comprising at least two listed URLs from among the plurality of listed URLs have the same display URL and, if so, eliminates at least one listed URL from among the subset of listed URLs having the same display URL, wherein specific listed URLs from among the subset of listed URLs having the same display URL are selected for elimination based on a selection rule, wherein the selection rule for the elimination of specific listed URLs from among the subset of listed URLs having the same display URL is for lesser paying listed URLs to be eliminated.

24. The computer-readable medium of claim 23 wherein the plurality of listed URLs are the results of a search engine query.

25. The computer-readable medium of claim 23 wherein the plurality of listed URLs are derived from a compilation of search engine query results.

26. The computer-readable medium of claim 23 wherein the computer-readable medium operates recursively to eliminate all but one listed URL for each unique display URL determined by the computer-readable medium for the plurality of listed URLs.

27. The computer-readable medium of claim 23 wherein the computer-readable medium operates recursively to eliminate all but one listed URL for each unique display URL determined by the computer-readable medium for the plurality of listed URLs, except that any listed URL which is immune from elimination is not eliminated.

28. The computer-readable medium of claim 23 wherein the selection rule for the elimination of specific listed URLs from among the subset of listed URLs having the same display URL is for a lesser relevant listed URL to be eliminated.

29. The computer-readable medium of claim 23 wherein, if any lesser paying listed URL has a higher relevance than the listed URL that is not being eliminated, then the content from the lesser paying listed URL with the highest relevance is swapped with the content for the listed URL that is not being eliminated.

30. The computer-readable medium of claim 23 wherein the selection rule is comprised of at least two sub-rules.

31. The computer-readable medium of claim 23 wherein the selection rule comprises a sub-rule that, if none of the listed URLs among the subset of listed URLs having the same display URL are paying URLs, the lesser relevant URLs from among the subset of listed URLs are eliminated.

32. The computer-readable medium of claim 23 wherein the selection rule comprises a sub-rule that, if at least one listed URL from among the subset of listed URLs having the same display URL is a paying URL and the other listed URLs are not paying URLs, the listed URLs that are not paying URLs are eliminated.

33. The computer-readable medium of claim 32 wherein, if any listed URL that is not a paying URL has a higher relevance than any listed URL that is a paying URL, then the content from a listed URL that is not a paying URL having the highest relevance is swapped with the content for a listed URL that is a paying URL having a lower relevance.

34. The computer-readable medium of claim 33 wherein the instructions operate recursively, swapping content between listed URLs, until all listed URLs that are paying URLs have a higher relevance than all listed URLs that are not paying URLs.

35. The computer-readable medium of claim 32 further comprising the element of, from among the paying URLs, if none of the paying URLs are immune from elimination, then the lesser relevant paying URLs are eliminated.

36. The computer-readable medium of claim 35 wherein, if any paying URL that is not immune from elimination has a higher relevance than any paying URL that is immune from elimination, then the content from a paying URL that is not immune from elimination having the highest relevance is swapped with the content for a paying URL immune from elimination having a lower relevance.

37. The computer-readable medium of claim 36 wherein, if any lesser paying listed URL have a higher relevance than the listed URL that is not being eliminated, then the content from the lesser paying listed URL with the highest relevance is swapped with the content for the listed URL that is not being eliminated.

38. The computer-readable medium of claim 32 further comprising the element of, from among the paying URLs, if at least one paying URL is immune from elimination, then all paying URLs that are not immune from elimination are eliminated.

39. The computer-readable medium of claim 23 wherein the selection rule comprises a sub-rule that, if the subset of listed URLs is comprised of at least two listed URLs having the same display URL, at least one of which is immune from elimination, then the listed URLs that are not immune from elimination are eliminated.

40. The computer-readable medium of claim 23 wherein the selection rule comprises a sub-rule that, if the subset of listed URLs is comprised of at least two listed URLs having the same display URL, at least one of which is immune from elimination, then the listed URLs that are immune from elimination are not eliminated.

* * * * *